United States Patent [19]

Hlavaty

[11] Patent Number: 5,308,129
[45] Date of Patent: May 3, 1994

[54] DOOR HARDWARE MODULE WITH LATCH

[75] Inventor: David G. Hlavaty, Allen Park, Mich.

[73] Assignee: General Motors Corporation, Detroit, Mich.

[21] Appl. No.: 15,039

[22] Filed: Feb. 8, 1993

Related U.S. Application Data

[63] Continuation of Ser. No. 857,116, Mar. 9, 1992, abandoned, which is a continuation of Ser. No. 602,593, Oct. 24, 1990, abandoned.

[51] Int. Cl.[5] ............................................. E05C 21/00
[52] U.S. Cl. ......................... 292/216; 292/DIG. 53; 292/DIG. 55; 292/DIG. 60; 24/701; 49/394; 49/502
[58] Field of Search ................... 292/341.18, 91, 216, 292/116, 120, 337, DIG. 53, DIG. 55, DIG. 60; 49/394, 502; 24/625, 297, 701, 686, 683

[56] References Cited

U.S. PATENT DOCUMENTS

| | | | |
|---|---|---|---|
| 1,638,198 | 8/1927 | Heintz | 49/394 |
| 2,904,141 | 9/1959 | Henrichs | 292/341.18 |
| 3,310,929 | 3/1967 | Garvey | 24/297 |
| 4,328,642 | 5/1982 | Presto | 49/502 |
| 4,579,473 | 4/1986 | Brugger | 24/625 |
| 4,603,894 | 8/1986 | Osenkowski | 292/216 |
| 4,702,505 | 10/1987 | Alexander | 292/341.18 |
| 4,932,105 | 6/1990 | Muller | 24/701 |
| 5,007,668 | 4/1991 | Di Giusto | 292/DIG. 53 |

Primary Examiner—Peter M. Cuomo
Assistant Examiner—Darnell Boucher
Attorney, Agent, or Firm—Charles E. Leahy

[57] ABSTRACT

A mounting panel of stamped steel has the door hardware such as the window regulator and door handles fixedly mounted thereon to facilitate preassembly and shipping. The mounting panel is subsequently mounted on the vehicle door. A door latch is provided for latching the door in the closed position and a retainer means is provided acting between the mounting panel and the door latch to loosely connect the door latch to the mounting panel for convenience of preassembly and shipping. The retainer means is a molded plastic retainer having integral projections which are force fit into plurality of openings provided in a door latch. The retainer means also has an integral headed prong structure which is loosely retained within an opening in the mounting panel with the aperture being oversized with respect to the headed prong to thereby permit adjusting movement of the door latch relative to the mounting panel. Upon bolting of the mounting panel to the door, and the separate bolting of the door latch to the door, the mounting panel and the door latch are permitted to float relative one another so that each can seek its own mounting relationship on the door.

3 Claims, 2 Drawing Sheets

DOOR HARDWARE MODULE WITH LATCH

This is a continuation of application Ser. No. 07/857,116 filed on Mar. 9, 1992, now abandoned, which was a continuation of application Ser. No. 07/602,593 filed on Oct. 24, 1990, now abandoned.

The invention relates to a preassembled hardware module for a vehicle door and provides for loose fitting attachment of the door latch onto the module for subsequent independent attachment of the module and the door latch on the vehicle door.

BACKGROUND OF THE INVENTION

It is known in motor vehicles to preassemble various hardware elements of the vehicle door onto a stamped steel module panel which is then subsequently attached to the vehicle door in the assembly plant. The advantage of such a modular construction is that that door hardware elements such as the window regulator, door latch, door handle and other door components may be preassembled and pretested prior to shipment to the assembly line.

It would be desirable to provide such a hardware modular arrangement in which the door latch could be preassembled to the door module for convenience in testing and shipping and yet the module and door latch could be separately bolted to the vehicle door structure as necessary to perform their respective functions and in spite of any dimensional variations which might exist between the doors in which the module is to be mounted.

SUMMARY OF THE INVENTION

According to the invention a mounting panel of stamped steel has the door hardware such as the window regulator and door handles fixedly mounted thereon to facilitate preassembly and shipping. The mounting panel is subsequently mounted on the vehicle door. A door latch is provided for latching the door in the closed position and a retainer means is provided acting between the mounting panel and the door latch to loosely connect the door latch to the mounting panel for convenience of preassembly and shipping. The retainer means is a molded plastic retainer having integral projections which are force fit into plurality of openings provided in a door latch. The retainer means also has an integral headed prong structure which is loosely retained within an opening in the mounting panel with the aperture being oversized with respect to the headed prong to thereby permit adjusting movement of the door latch relative to the mounting panel. Upon bolting of the mounting panel to the door, and the separate bolting of the door latch to the door, the mounting panel and the door latch are permitted to float relative one another so that each can seek its own mounting relationship on the door.

Accordingly, the object feature and advantage of the invention resides in the provision of a door hardware module in which a door latch is loosely and adjustably connected to the mounting panel by retaining means so that the door latch may be preassembled and tested and shipped with the module and yet upon bolting to the vehicle door the mounting panel and door latch are permitted to seek their respective mounting locations by free floating movement relative one another.

DESCRIPTION OF THE DRAWINGS

These and other objects, features and advantages of the invention will become apparent upon consideration of the description of the preferred embodiment and the appended drawings in which.

DESCRIPTION OF THE PREFERRED EMBODIMENT

Figure 1:
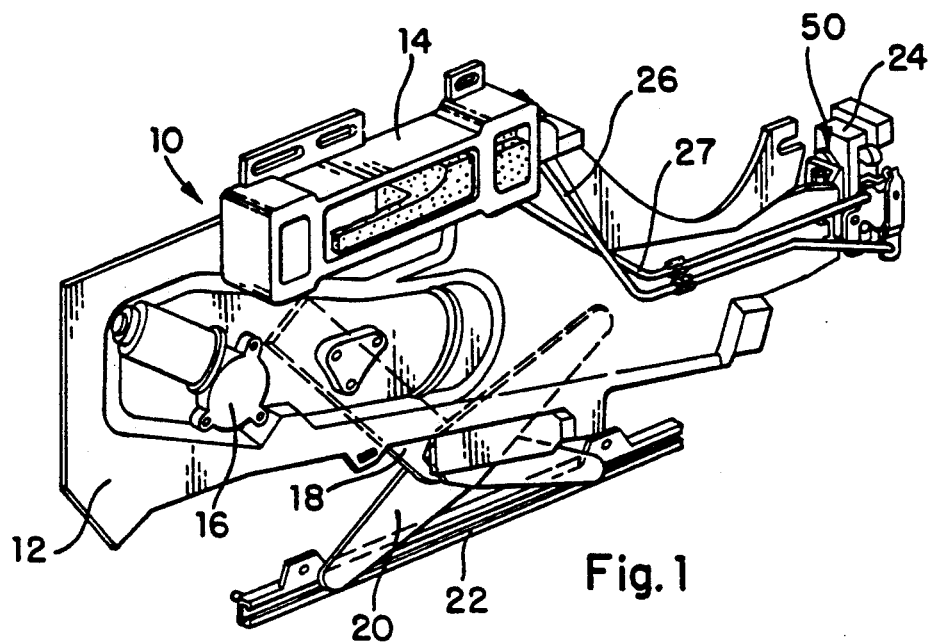
FIG. 1 is perspective view of a door hardware module including a mounting panel having the door latch loosely connected thereto.

In FIG. 1 a door hardware module, generally indicated at 10, is comprised of a stamped sheet metal panel 12 to which various door hardware elements such as a handle assembly 14, window regulator motor 16, window lift arm 18, window regulator arm 20, and window sash 22 are attached. A door latch assembly 24 is also connected to the mounting panel 12 as will be discussed further hereinafter. Operating rods 26 and 27 extend between the handle assembly 14 and the door latch assembly 24.

The hardware module as shown in FIG. 1 is preferably preassembled and tested prior to being delivered to the assembly line.

Figure 2:
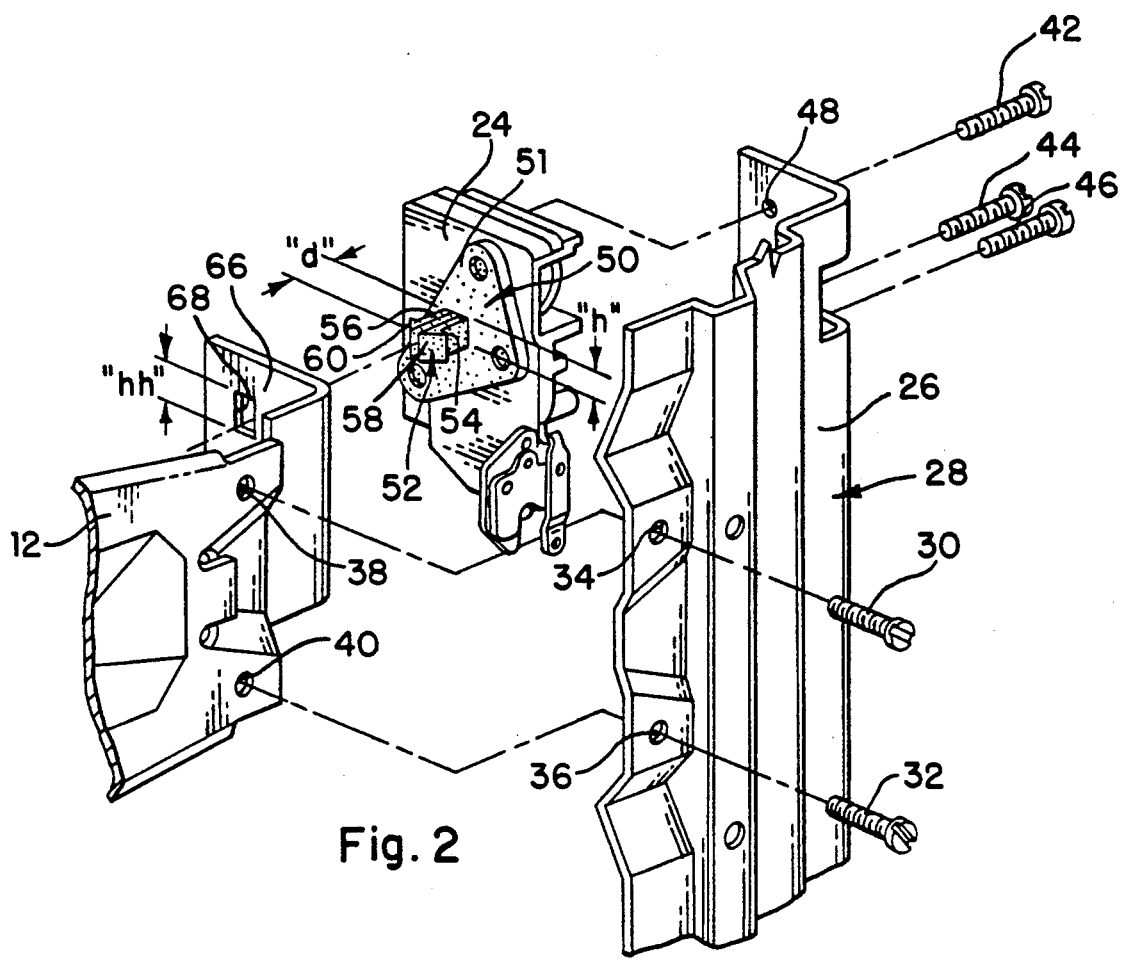
FIG. 2 is an exploded view showing the independent attachment of the mounting panel and the door latch to the vehicle door.

As shown in FIG. 2 the sheet metal panel 12 and the door latch assembly 24 become bolted to the vehicle door 28. In particular, a pair of bolts 30 and 32 extend through apertures 34 and 36 of the door 28 and screw into bolt holes 38 and 40 of the mounting panel 12. Bolts 42, 44 and 46 extend through apertures 48 and screw into threaded apertures provided in the door latch assembly 24.

Figures 5, 6:
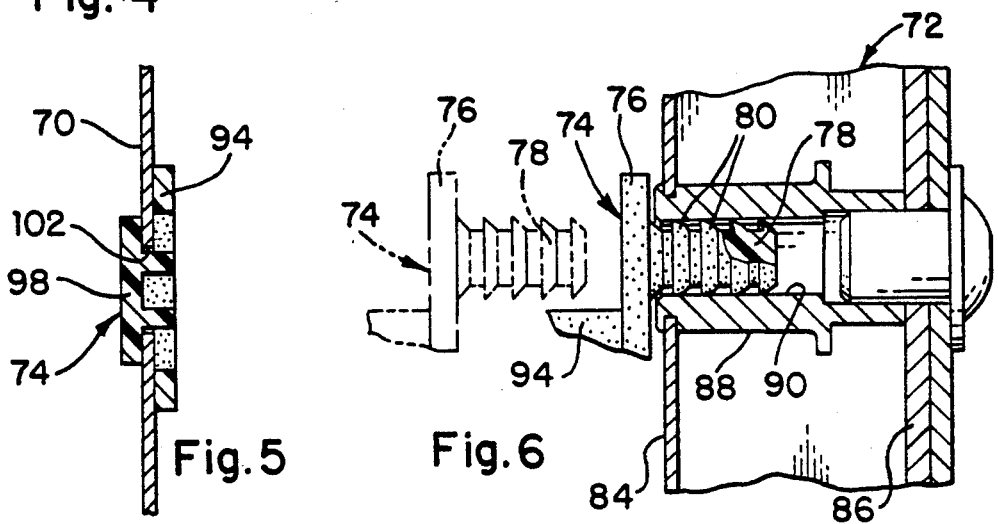
FIG. 5 is a section view taken in the direction of arrows 5—5 of FIG. 4.
FIG. 6 is a enlarged section view taken from FIG. 3.

As seen in FIG. 2, a molded plastic retainer 50 is provided for loosely connecting the door latch assembly 24 to the mounting panel 12. The plastic retainer 50 has a base 51 which is attached to the door lock assembly 24 and has an integrally molded prong structure 52 which is comprised of a pair of prongs 54 and 56 which respectively carry tapered heads 58 and 60 at the distal ends thereof The preferred attachment between the plastic retainer 50 and the door latch assembly 24 is the same as shown in FIG. 6 which will be discussed hereinafter with respect to a second embodiment of this invention.

The end of the mounting plate 12 carries an integral lateral bracket 66 which has a aperture 68 stamped therein. The door latch assembly 24 is loosely connected to the panel 12 by inserting the prong structure 52 through the aperture 68. In so doing, the tapered heads 58 and 60 co-act with the lateral bracket 66 to yield the prongs 54 and 56 inwardly toward one another to permit the tapered heads 58 and 60 to pass through the aperture 68. After the tapered heads 52, 58 and 60 pass through the aperture 68, the prongs 54 and 56 spring outwardly to their normal relationship so that the tapered head 58 and 60 will prevent the withdrawal of the prong structure 52 from the aperture 68.

The length of the prong structure 52, as measured by the distance "d" from the base 51 of the plastic retainer to the underside of tapered heads 58 and 60, is substantially greater than the thickness of the stamped metal panel 12 at the lateral bracket 66 so that the lock assembly 24 is permitted to float substantially in the longitudinal direction relative to the panel 12. In addition, the height "hh" of the aperture 68 is greater than the height "h" of the prong structure 52 so that the door latch is permitted to move somewhat vertically in relation to the panel 12.

The aforedescribed loose connection of the door latch assembly to the panel 12 is employed to connect the door latch assembly 24 to the panel 12 and thereby make up the module 10 shown in FIG. 1.

Upon delivery to the assembly line, the module is mounted on the vehicle door by installing the bolts 30 and 32 to attach the panel 12 to the door 28 and installing the bolts 42, 44 and 46 to attach the door latch assembly 24 to the door 28. The prong structure 52 permits the door latch assembly 24 and the panel 12 to float somewhat relative each other to facilitate and enable their independent attachment onto the door 28.

Figure 3:
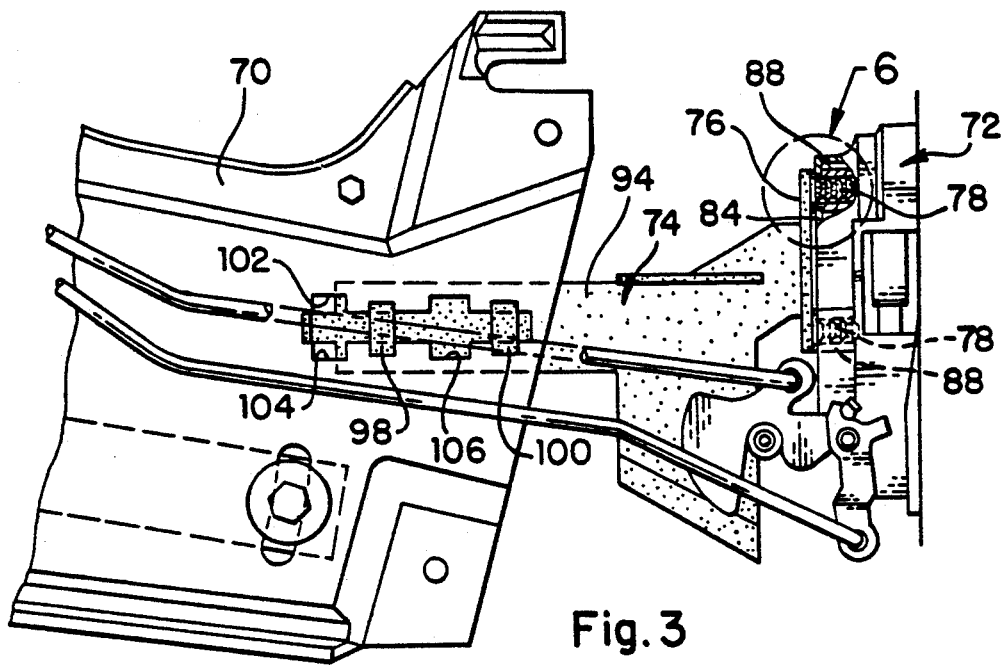
FIG. 3 is a side elevation view of the second embodiment of the invention.

Referring to FIGS. 3 through 6, a second embodiment of the invention is shown. In FIG. 3, a stamped metal panel 70 is loosely connected to the door latch assembly 72 by a molded plastic retainer 74. As seen in FIGS. 3 and 6, the molded plastic retainer includes a base wall 76 which has a plurality of integrally molded projections 78 having a plurality of integrally molded flexible fins 80. The door latch assembly 72, as best shown in FIG. 6, includes base plates 84 and 86 which are spaced apart and connected together by hollow tubular spacer sleeves 88. Reference may be had to U.S. Pat. No. 4,756,563 for further description of the door latch of FIG. 6.

Figure 4:
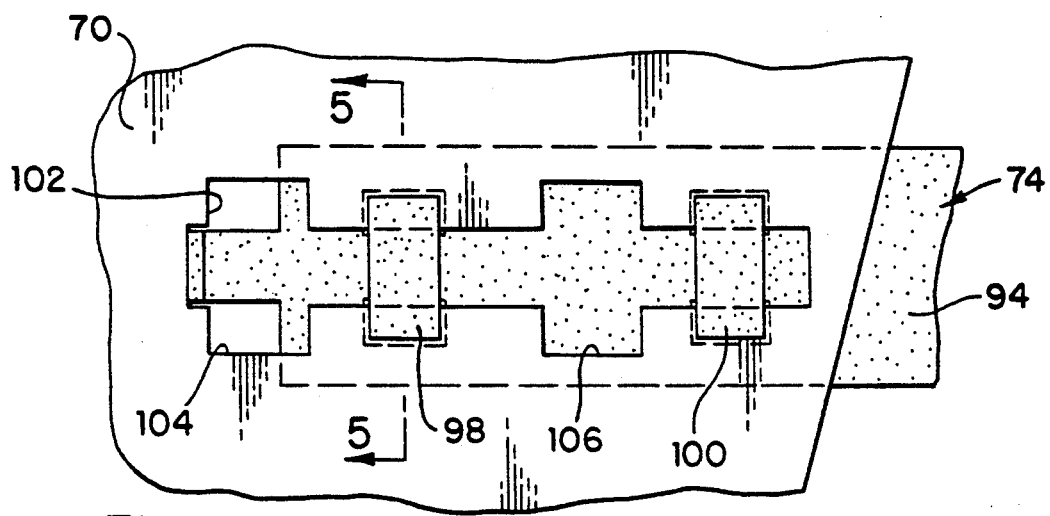
FIG. 4 is an enlarged fragmentary view of FIG. 3.

As best seen in FIG. 6, the molded plastic retainer 74 is attached to the door lock assembly 72 by thrusting the projections 78 into the bore 90 of the sleeve 88 as permitted by the yielding and frictional engagement of the fins 80 with the bore 90. The plastic retainer 74 also includes a wall 94 which reaches longitudinally to the panel 70. As best seen in FIGS. 4 and 5, a pair of headed prong structures 98 and 100 are molded integrally with the wall 94 and are spaced longitudinally relative one another. In addition, as seen in FIG. 4, an elongated longitudinally extending aperture 102 is provided in the panel 70 and includes a pair of enlarged access openings 104 and 106 which are large enough to permit insertion of the headed prong structures 98 and 100 through the aperture 102. Then, the plastic retainer 74 is slid rightwardly to the position shown in FIG. 4 in which the headed projection 98 and 100 will overlie the walls of the panel 70 adjacent the slot 102 to thereby effectively connect the retainer 74 to the panel 70 and yet permit longitudinal sliding movement between the retainer 74 and the panel 70. Accordingly, as shown in FIG. 3, the plastic retainer 74 and latch assembly 72 are adjustably connected to the panel 70 so that, upon assembly into the vehicle door, the panel 70 and latch assembly 72 may be independently bolted to the door irrespective of dimensional variation which may occur between particular doors.

Thus it is seen that the invention provides a new and improved module for a door in which a molded plastic retainer is attached to the door latch assembly and loosely and adjustably connects to the module panel in a manner enabling adjusting movement between the panel and the latch assembly.

The embodiments of the invention in which an exclusive property or privilege is claimed are defined as follows:

1. In combination,
   a door having a front end and rear end;
   a mounting panel having door hardware fixedly mounted thereon and having front and rear ends adapted for fixed attachment on the door to thereby mount the door hardware on the door;
   a door latch adapted for fixed attachment on the rear end of the door for latching the door in a closed position;
   said door hardware including at least a door handle and operating rod means connecting the handle to the latch;
   retainer means acting between the rear end of the panel and the door latch independent of the door handle and the operating rod means to loosely connect the door latch to the mounting panel in readiness for the subsequent fixed attachment of the mounting panel and the door latch on the door;
   first fasteners independent of the retainer means for fixedly attaching the door latch on the door;
   and second fasteners independent of both the retainer means and the first fasteners for fixedly attaching the rear end of the mounting panel to the door.

2. In combination,
   a door having a front end and rear end;
   a mounting panel having door hardware fixedly mounted thereon and having front and rear ends adapted for fixed attachment on the door to thereby mount the door hardware on the door;
   a door latch adapted for fixed attachment on the rear end of the door for latching the door in a closed position;
   said door hardware including at least a door handle and operating rod means connecting the handle to the latch;
   retainer means acting between the rear end of the panel and the door latch independent of the door handle and the operating rod means to loosely connect the door latch to the mounting panel in readiness for the subsequent fixed attachment of the mounting panel and door latch on the door, said retainer means having a molded plastic retainer mounted on the door latch and having integral prongs and an aperture in the mounting panel receiving the integral prongs, and said aperture being oversized with respect to the integral prongs to thereby loosely connect the door latch to the mounting panel;
   first fastener as independent of the retainer means for fixedly attaching the door latch on the rear end of the door;
   and second fasteners independent of both the retainer means and the first fasteners for fixedly attaching the rear end of the mounting panel to the door.

3. In combination,
   a door having a front end and rear end;
   a mounting panel having door hardware fixedly mounted thereon and having front and rear ends adapted for fixed attachment on the door to thereby mount the door hardware on the door, said mounting panel having an opening in the rear end thereof;

a door latch adapted for fixed attachment on the rear end of the door for latching the door in a closed position, said door latch having a plurality of openings therein, said door hardware including at least a door handle and operating rod means connecting the handle to the door latch;

a molded plastic retainer having a plurality of projections thereon adapted for press fit into the openings of the door latch to attach the retainer to the door latch, and said retainer having a headed prong integral therewith and adapted for loose fitting insertion into the opening of the mounting panel independent of the door handle and the operating rod means in readiness for the subsequent fixed attachment of the mounting panel and door latch on the door;

first fasteners independent of the retainer for fixedly attaching the door latch on the rear end of the door;

and second fasteners independent of both the retainer and the first fasteners for fixedly attaching the rear end of the mounting panel to the door.

* * * * *